United States Patent
Sherwin (10) Patent No.: US 8,434,921 B2
(45) Date of Patent: *May 7, 2013

(54) APPARATUS TO PROVIDE VARIABLE ILLUMINATED SIGNALS FOR THE PRESENCE OF BICYCLES AND OTHER VEHICLES

(75) Inventor: Gerald A. Sherwin, St. Petersburg, FL (US)

(73) Assignee: Gerald A. Sherwin, St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/310,350

(22) Filed: Dec. 2, 2011

(65) Prior Publication Data

US 2012/0075874 A1    Mar. 29, 2012

Related U.S. Application Data

(63) Continuation-in-part of application No. 12/798,030, filed on Mar. 29, 2010, now Pat. No. 8,092,055.

(51) Int. Cl.
*B62J 6/00* (2006.01)

(52) U.S. Cl.
USPC ............... 362/473; 362/249.02; 362/249.03; 362/427; 362/428; 362/545; 340/431; 280/288.4

(58) Field of Classification Search ............ 362/249.02, 362/249.03, 427, 428, 431, 473–476, 523, 362/524, 528–530, 545; 340/431, 432, 468; 280/288.4

See application file for complete search history.

(56) References Cited

U.S. PATENT DOCUMENTS

| | | | |
|---|---|---|---|
| 3,586,348 A | 6/1971 | Rich | |
| 3,862,410 A | 1/1975 | Maxwell | |
| 4,051,361 A | 9/1977 | Lichon et al. | |
| 4,309,741 A | 1/1982 | Smith | |
| 4,598,339 A | 7/1986 | Ainsworth | |
| 5,272,609 A | 12/1993 | Nelson | |
| 5,379,197 A | 1/1995 | Conyers et al. | |
| 5,418,697 A | 5/1995 | Chiou | |
| 5,823,653 A | 10/1998 | Elam, Jr. et al. | |
| 7,232,244 B2 | 6/2007 | Naylor | |
| 7,367,700 B2 | 5/2008 | Chasmar | |
| 8,092,055 B2* | 1/2012 | Sherwin | 362/473 |
| 8,246,224 B2* | 8/2012 | Sherwin | 362/473 |
| 2005/0024884 A1 | 2/2005 | Seminara et al. | |
| 2007/0035956 A1 | 2/2007 | Topps | |

\* cited by examiner

*Primary Examiner* — Stephen F Husar
(74) *Attorney, Agent, or Firm* — Hahn Loeser & Parks LLP; Carlos P. Garritano (57) ABSTRACT

Microprocessor-controlled light emitting diode (LED) arrays are built into an extruded tubular lens within a mast that is connected to a base assembly. A means of mounting, which may be an adjustable clamp, permits the base assembly to be connected to a seat post or other mounting point on a bicycle or other vehicle. The tubular lens allows for substantial dispersion of light, and various light patterns produced by the arrays may be selected and those patterns alternated automatically to achieve greater visibility of the vehicle to surrounding motorists. A handle within the base assembly allows a rider to lower the mast from its vertical operating position easily and pivotally up to 90 degrees parallel to the longitudinal axis of the vehicle frame to facilitate mounting and dismounting the vehicle.

18 Claims, 12 Drawing Sheets

LIGHT PATTERNS

Pattern 1 = A,B,C,D,E    A,B,C,D,E    A,B,C,D,E
Pattern 2 = C,BD,AE    C,BD,AE    C,BD,AE
Pattern 3 = A,B,C,D,E,D,C,B    A,B,C,D,E,D,C,B    A,B,C,D,E,D,C,B

APPARATUS TO PROVIDE VARIABLE ILLUMINATED SIGNALS FOR THE PRESENCE OF BICYCLES AND OTHER VEHICLES

CROSS-REFERENCE TO RELATED APPLICATIONS

This application is a Continuation-In-Part (CIP) Application that claims the benefit of U.S. Pat. No. 8,092,055, filed Mar. 29, 2010, and entitled "APPARATUS TO PROVIDE VARIABLE ILLUMINATED SIGNALS FOR THE PRESENCE OF BICYCLES AND OTHER VEHICLES." The entirety of the aforementioned patent is incorporated herein by reference.

TECHNICAL FIELD

This invention relates to the field of illuminated vehicle safety lights supported by a vehicle structure, such as a bicycle seat post.

BACKGROUND

Bicycling is both a popular form of transportation as well as a ubiquitous sporting and recreational activity. In the absence of designated off-road bike paths, bicyclists must share the public roads and highways with motor vehicles of all types. Due to their relatively small size in relation to cars, SUVs, vans, trucks, and similar motor vehicles, bicycles are often difficult to see, especially at night, resulting in needless collisions between motor vehicles and bicycles and consequent injury or even loss of life.

Motorcycles, mopeds, scooters, ATVs, and similar vehicles, too, have become popular forms of transportation, sport, and recreation. Like bicycles, their relative size often makes them difficult to spot both in daylight hours, at dawn and dusk, and at night. Also like bicycles, a rider typically mounts them by hiking a leg over the rear frame of the vehicle behind the seat.

These vehicles employ various illuminated safety devices to increase their visibility to surrounding motorists. Such devices are superior to retro-reflector-based products because they virtually always make the presence of the vehicle identifiable from a greater distance, producing uniform light intensity without regard to illumination from a headlight or other source and without regard to the angle of incidence from that source.

Among the most effective of these devices are those which employ vertically disposed lights, mounted to upright poles or masts, which extend above the head of a bicyclist, motorcyclist, or other vehicle rider. Such an arrangement maximizes the visibility of the rider to surrounding motorists.

Existing devices of this nature, however, are typically affixed to the frame of the vehicle immediately behind the seat or adjacent to the seat, if not affixed to the seat itself, in a permanently upright position. As riders of bicycles, motorcycles, and similar vehicles ordinarily mount the vehicle by hiking one leg over the rear frame of the vehicle, these fixtures make getting on or off bicycles, motorcycles, or similar vehicles difficult. They provide no ready means of lowering and raising the pole or mast so that the rider may easily mount and dismount the vehicle in the conventional manner.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The present invention comprises microprocessor-controlled light emitting diode (LED) arrays built into an extruded tubular lens within a mast that is mounted to a base assembly. An adjustable clamp permits the base assembly to be connected to a seat post or other mounting point on a bicycle or other vehicle. The tubular lens allows for substantial dispersion of light and therefore greater visibility of the vehicle to surrounding motorists, and various light patterns produced by the arrays may be selected. A handle within the base assembly allows a rider to lower the mast from its vertical operational disposition easily and pivotally up to 90 degrees parallel to the longitudinal axis of the vehicle frame to facilitate mounting and dismounting the vehicle.

REFERENCE NUMERALS IN THE DRAWINGS

05 Mast
10 Extruded tubular lens
15 Handle member
20 Mast connector
25 Mast extension tube
30 Base assembly 35 Mast cap
40 Reflective graphics
45 Seat post
50 Seat clamp assembly
55 Seat clamp
60 Clamp cap
65 Detent joint
70 Array of paired light emitting diodes (LEDs)
75 Power source (e.g., nine-volt battery, solar panel, kinetic power-based source, combination thereof)
80 Printed Circuit Board (PCB)
85 Cable connector
90 Position handle
95 Mast mount
100 Notched wheel
105 Spring plunger
110 Wear plate
115 Main truss
120 Secondary truss
125 Hi-Low Thread Forming Screw
130 Hex bolt
135 Flat washer
140 Jaw nut
145 Head Sock Cap Screws (HSCS)
150 Reflective overlays
155 Control box
156 Wireless box
165 Lower segment
170 PWA
175 Battery compartment wall
180 Battery cover
185 Removable screw
190 Cable
200 Switch

DETAILED DESCRIPTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Features that are described and/or illustrated with respect to one embodiment may be used in the same way or in a similar way in one or more other embodiments and/or in combination with or instead of the features of the other embodiments. These and further aspects and features will be apparent with reference to the following description and attached drawings. In the description and drawings, particular embodiments of the subject innovation have been disclosed in detail as being indicative of some of the ways in which the principles of the subject innovation may be employed, but it is understood that the subject innovation is not limited correspondingly in scope. Rather, the subject innovation includes all changes, modifications and equivalents coming within the scope of the claims appended hereto. The accompanying illustrations are examples of the subject disclosure, but the innovation can appear in various embodiments depending on varying sleeve lengths and personal customizations that are not illustrated here.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs. It should be emphasized that the term "comprises/comprising" when used in this specification is taken to specify the presence of stated features, integers, steps or components but does not preclude the presence or addition of one or more other features, integers, steps, components or groups thereof.

The present invention comprises a mast, with an integrated illuminable extruded tubular lens, connected to a base assembly. The base assembly may, in turn, be connected by various mounting means to a mounting point on a vehicle. By means of a handle, the mast may be lowered pivotally to allow the vehicle rider to mount and dismount the vehicle readily and easily.

Figure 1:
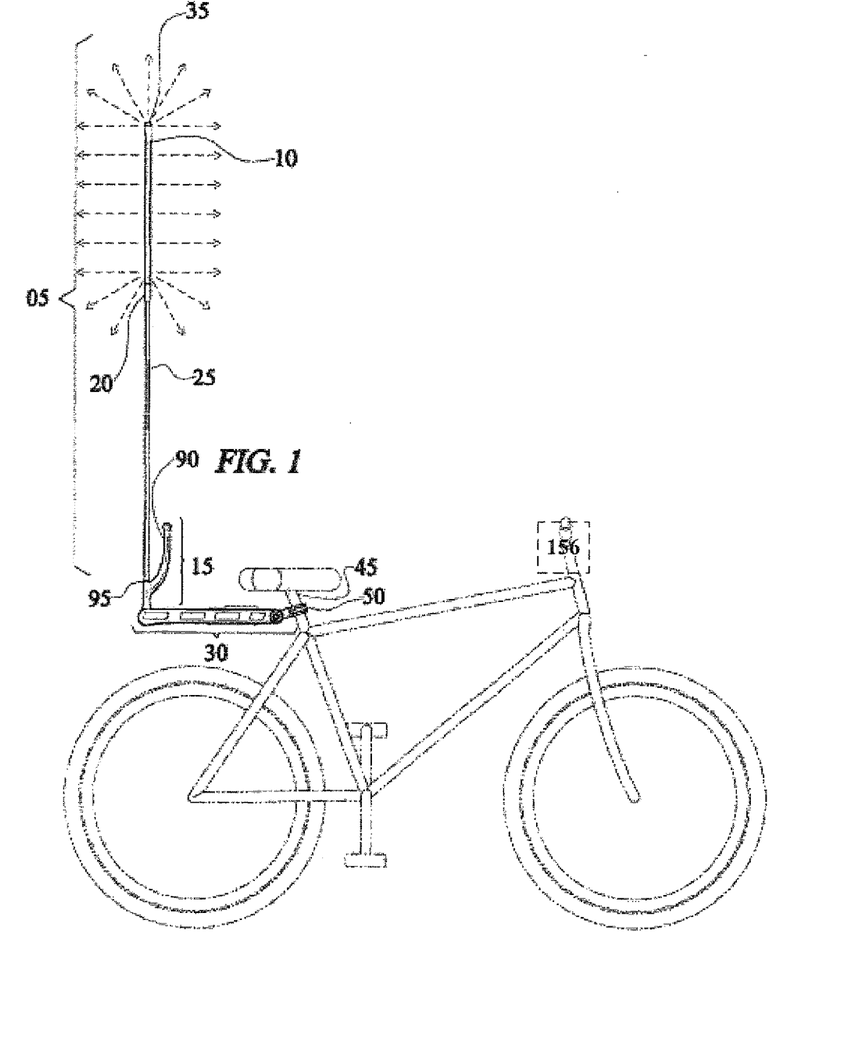
FIG. 1 is a right side view of a bicycle to which one embodiment of the present invention is attached.
Figure 3:
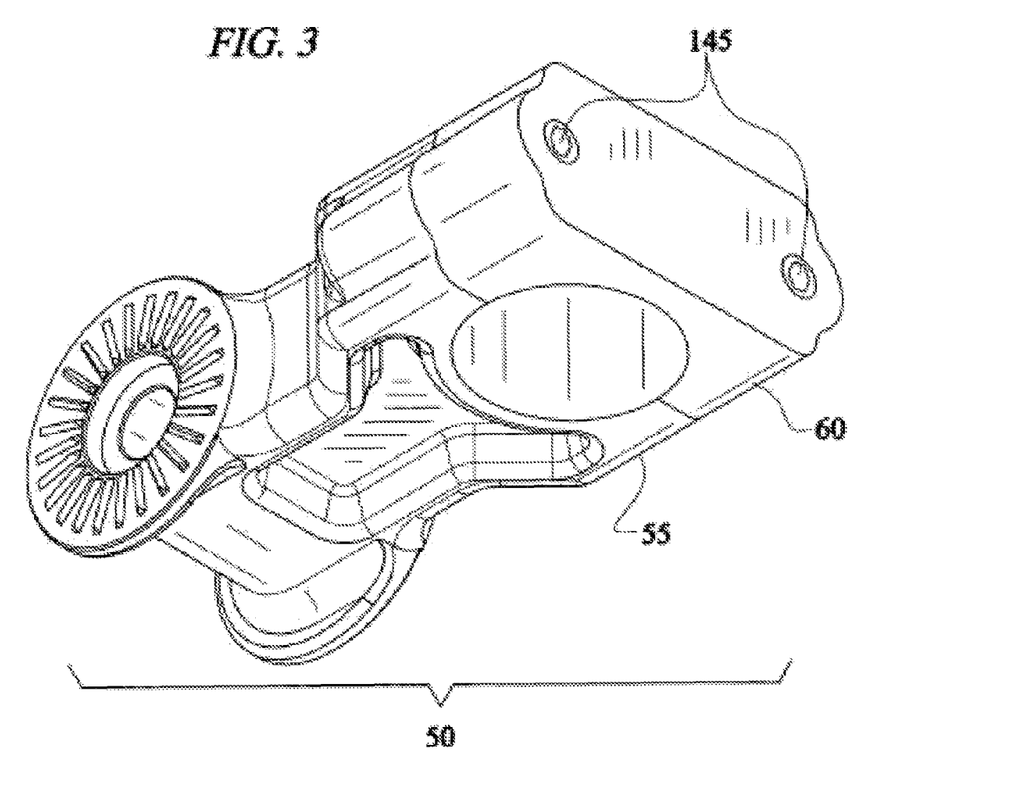
FIG. 3 is a close-up bottom front perspective view of the seat clamp member of the base assembly.

One possible embodiment of the instant invention, for use with a bicycle, is illustrated in the accompanying drawings. FIG. 1 displays a bicycle with an adjustable seat post 45. The seat post 45 serves as a mounting point for the base assembly 30, which attaches to the seat post 45 by means of its integrated seat clamp assembly 50 (a close-up view of which is provided in FIG. 3). In the normal operating position, the mast 05 is vertically disposed as illustrated, maximizing visibility of the bicycle as the tubular lens 10 is elevated to its maximum height in relation to the bicycle. When used on other vehicles, such as, without limitation, motorcycles, mopeds, motor scooters, all terrain vehicles (ATVs), snowmobiles, or tractors, a mounting member other than a seat post may be employed as the point of connection between the base assembly and the vehicle. Connection means other than a clamp may be employed to attach the base assembly to a given mounting member of a vehicle.

Figure 2:
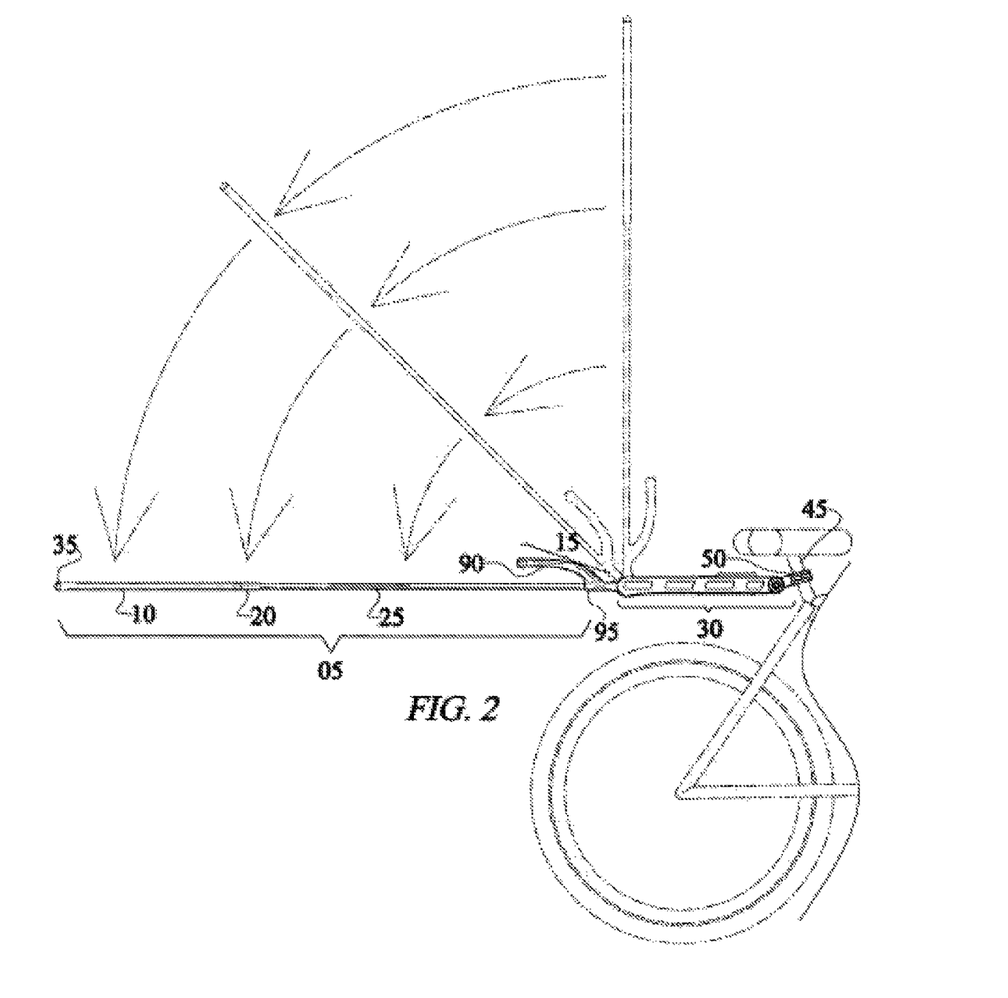
FIG. 2 is a right side view of said embodiment of the invention, attached to the seat post of a bicycle, in which a handle has been used to lower the mast approximately 90 degrees from an upright to a substantially horizontal position along the axis of the bicycle frame.
Figure 4:
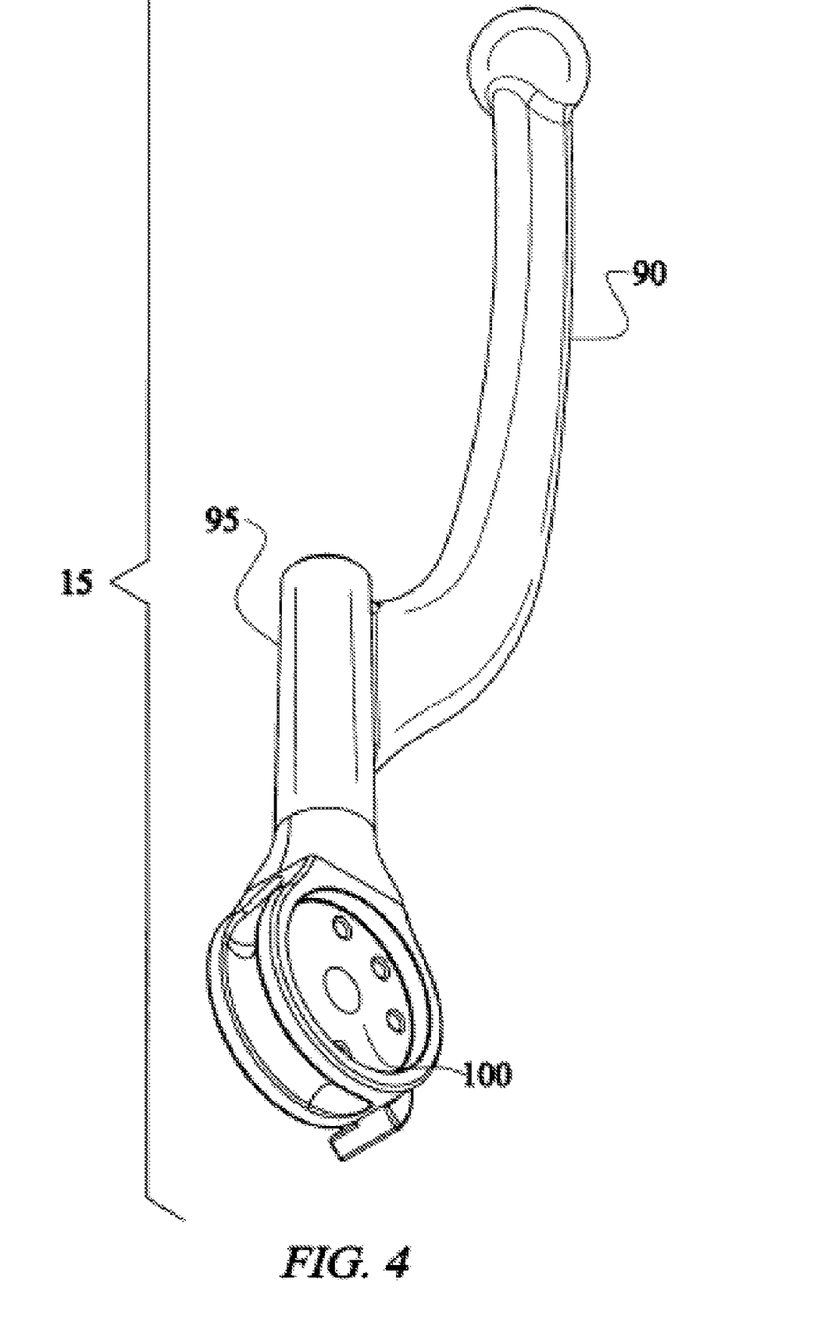
FIG. 4. is a close-up bottom rear perspective view of the handle member of the base assembly.

As shown in FIG. 2, the illustrated embodiment comprises a handle member 15 (a closeup view of which is provided in FIG. 4), including a position handle 90 and mast mount 95, incorporated into the base assembly 30, which the bicycle rider may use to pivot the mast 05 to a 45-degree angle and thence to a 90-degree angle. This innovation allows a rider to move the mast 05 to a horizontal position, parallel to the frame of the bicycle, to facilitate mounting and dismounting the bicycle, while maintaining the mast 05 securely in a vertical operating position while riding. It is to be appreciated that the handle member 15 can be utilized to pivot the mast 05 to any degree of angle approximately from the horizontal position, parallel to the ground, to a vertical position of approximately 90 degrees there from. In other words, the handle member 15 can allow a user to adjust the mast 05 to any angle from a horizontal (approximately zero (0) degrees) position to a vertical (approximately ninety (90) degrees) position.

Figure 5:
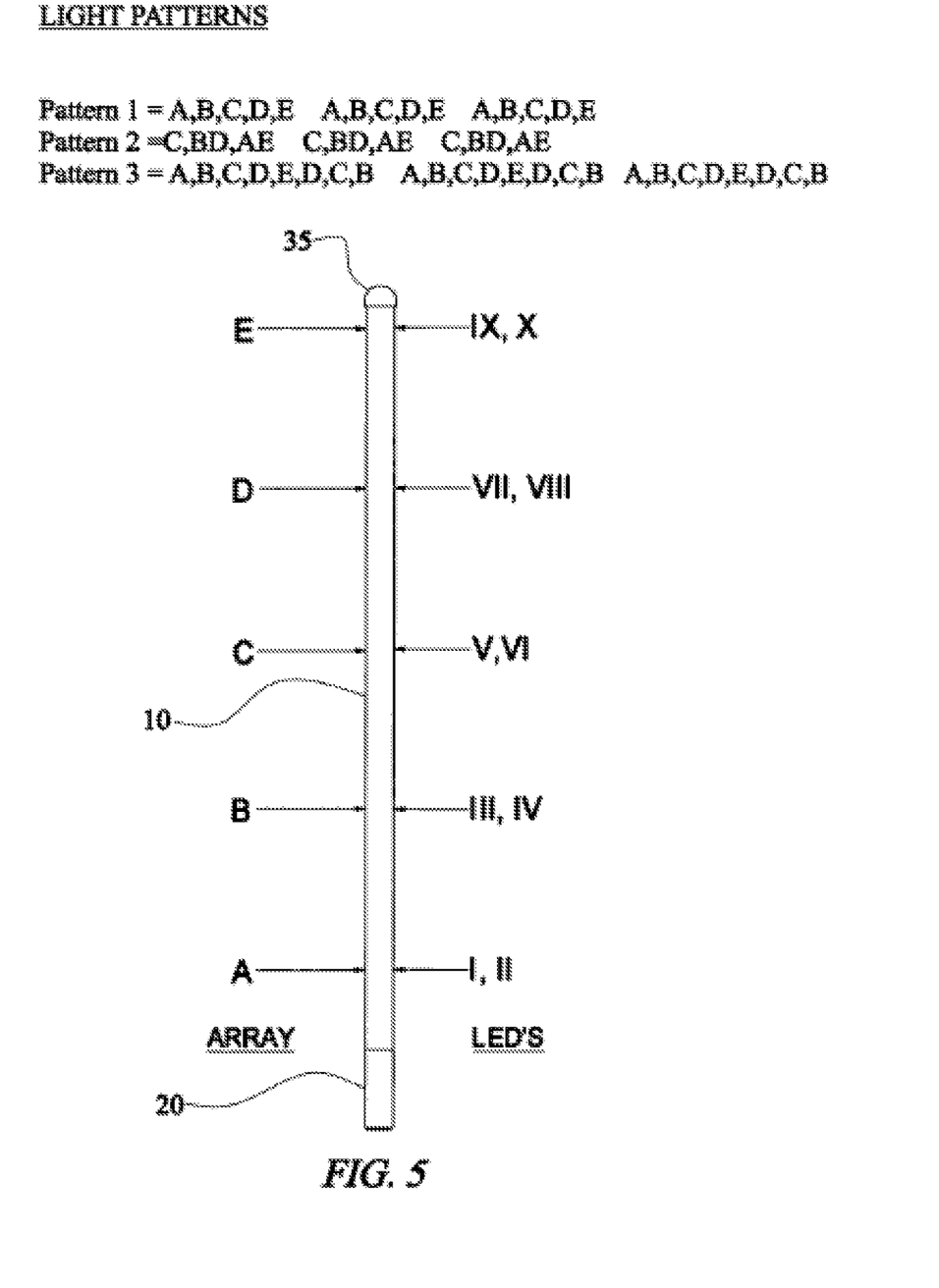
FIG. 5 reflects the relative positions of five arrays and ten LEDs within the lens in said embodiment of the invention and describes three of the many possible patterns for the display of the lights in each array.

FIG. 5 illustrates how different light patterns, calculated to promote and enhance visibility, are achieved in this embodiment of the present invention through the use of a programmable microprocessor embedded in a printed wiring assembly (PWA) within a control box. The patterns may be programmably reconfigured to optimize the visibility of the vehicle to which the apparatus is attached as field data are collected. Programming the microprocessor to alternate automatically among various patterns while the apparatus is powered on further enhances visibility of the vehicle.

Within the tubular lens 10, as shown in FIG. 5, are positioned five arrays, lettered A through E, of surface mounted technology (SMT) light emitting diodes (LED) in pairs, designated i and ii (the pair for A), iii and iv (the pair for B), v and vi (the pair for C), vii and viii (the pair for D) and ix and x (the pair for E). The color of the lights used in each array can be varied, and the arrays are spaced apart to enhance visibility at a distance. By way of example, but not limitation, levels A, C, and E could have LEDs in the amber to yellow range, while Band D could have LEDs in the green range, with each array being spaced between one to twelve inches from every immediately adjacent array (i.e., A from B, B from A and C, C from B and D, etc.). Three possible representative patterns are set forth at the top of FIG. 5.

The illustrated embodiment could be programmed to alternate automatically between the first such pattern, the second such pattern, and the third such pattern in any given order or time interval desired while the apparatus is powered on. Typically, the programming of given patterns and alternating sequences or combinations of patterns will be accomplished by a manufacturer, although a switch, knob, or other suitable selection means could be incorporated into the apparatus to allow a vehicle user to choose between various patterns or sequences and combinations of patterns, the range of which patterns, sequences, or combinations could be preselected by a manufacturer for their efficacy in achieving safety and overall visibility.

Figure 6:
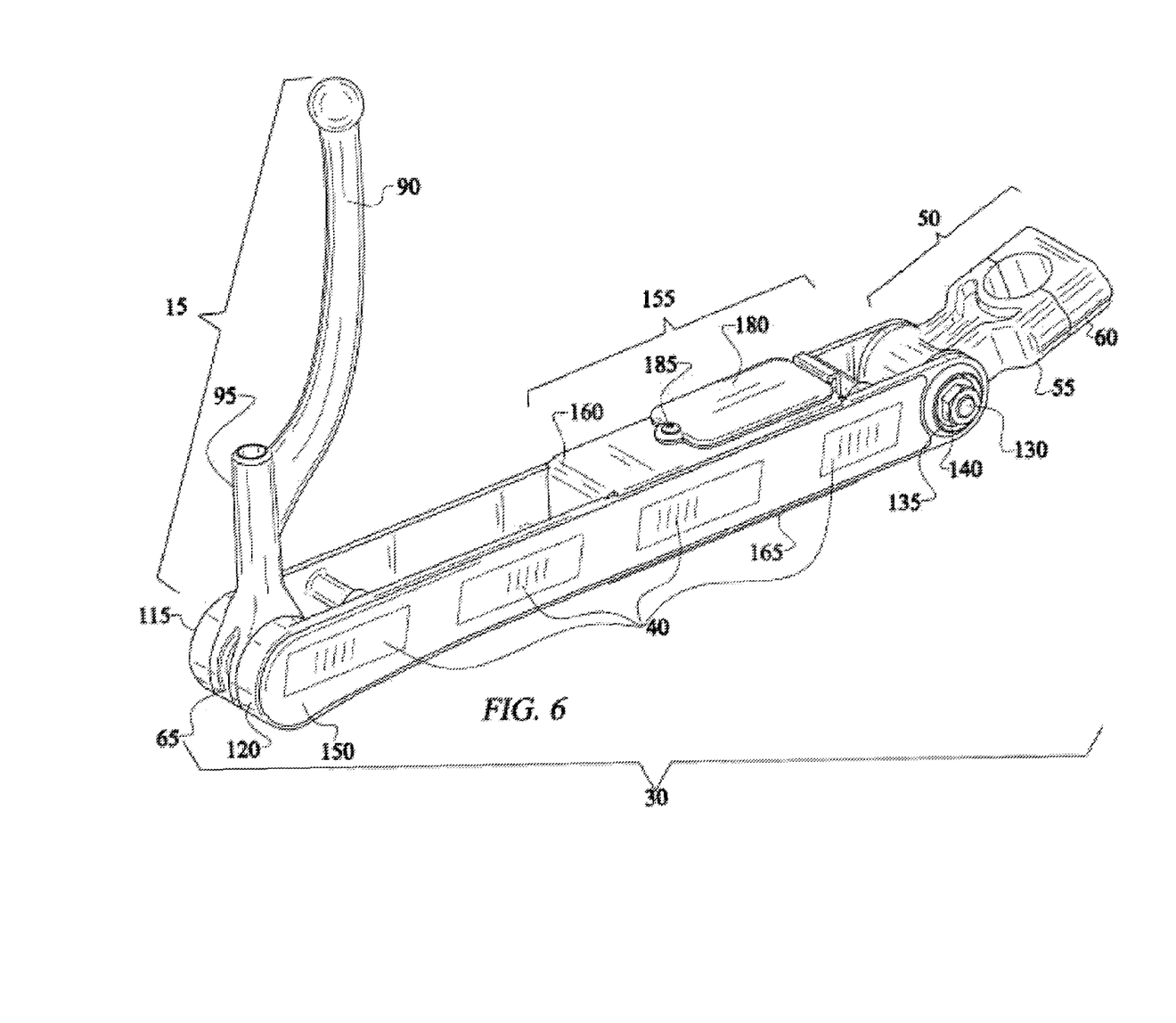
FIG. 6 is a close up elevated right rear perspective view of the features of the base assembly of said embodiment of the invention.
Figure 7:
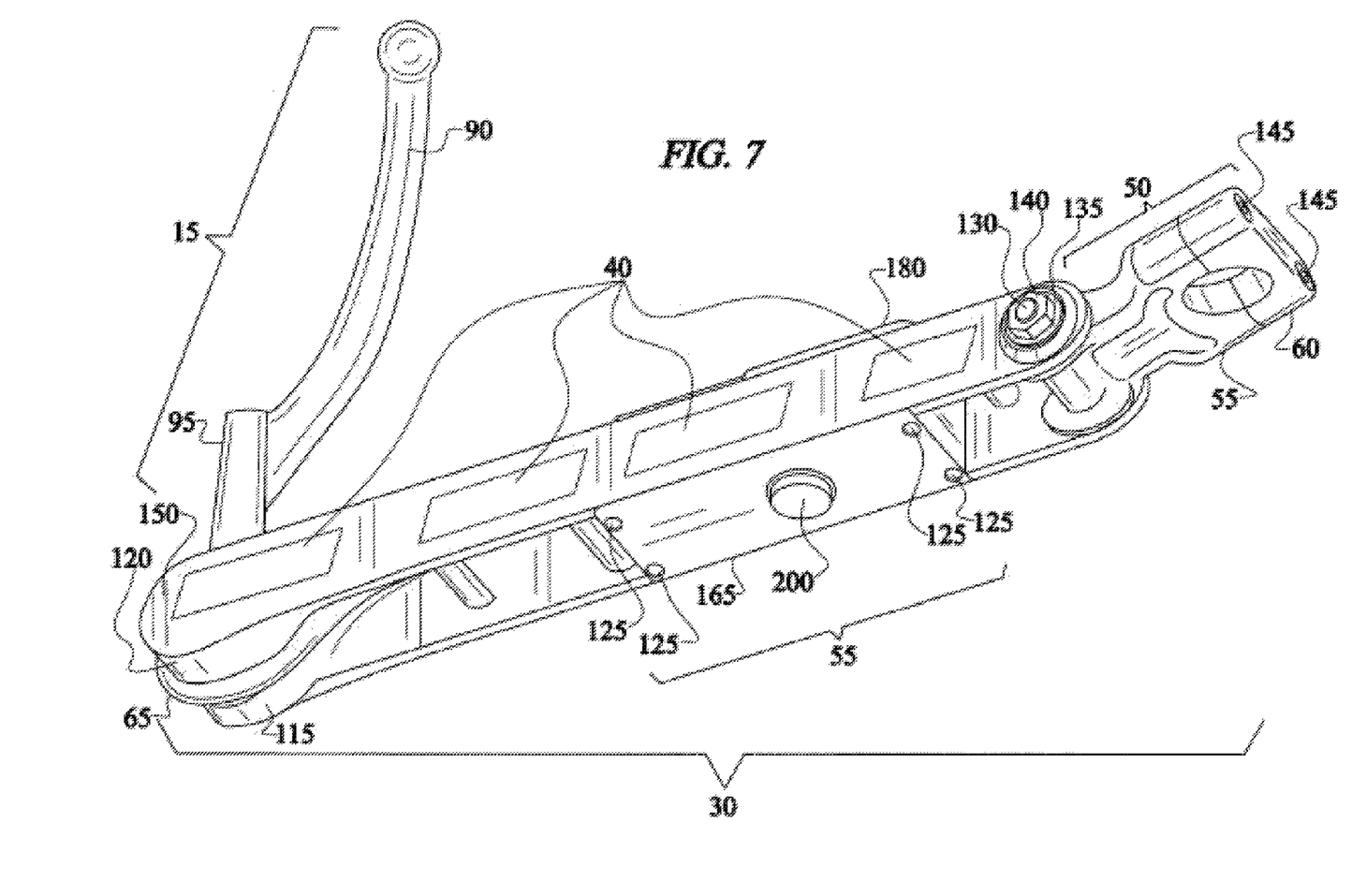
FIG. 7 is a close up right front underside perspective view of the features of the base assembly of said embodiment of the invention.

FIG. 6 and FIG. 7 present different close-up perspective views of the base assembly 30 without the mast connected. In FIG. 6 is presented a closeup right rear elevated perspective view of the base assembly 30. A control box 155 is situated between the seat clamp assembly 50 and the handle member 15 of the base assembly 30, within a main truss 115 and a secondary truss 120 that together join to form the base assembly 30 and contribute to form the control box 155. A close-up front underside perspective view of the base assembly 30 appears in FIG. 7. A button or switch 200 to activate the LEDs in the tubular lens of the mast can be positioned underneath the control box, as illustrated here, or in any other suitable location.

Figure 8:
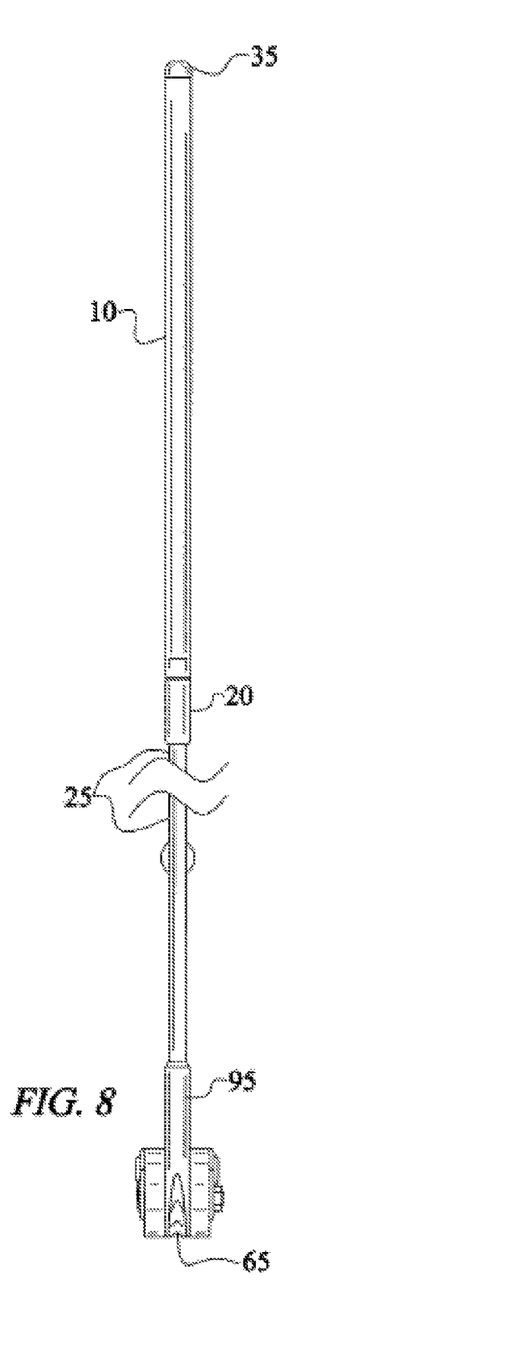
FIG. 8 is a rear end view of said embodiment of the invention, facing the detent joint.
Figure 9:
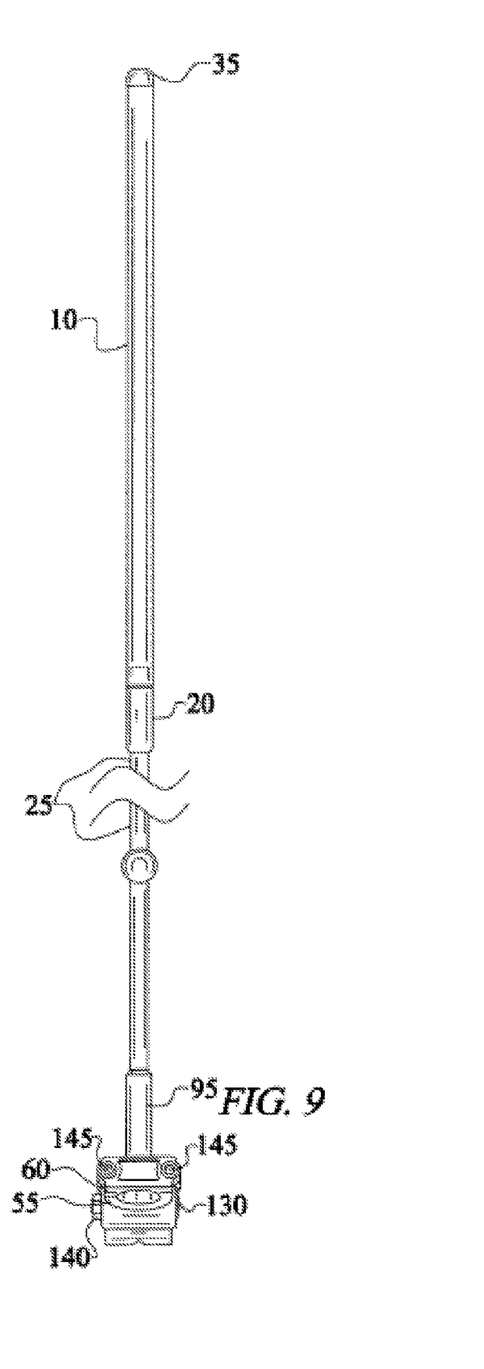
FIG. 9 is a front end view of said embodiment of the invention, facing the seat post clamp.
Figure 10:
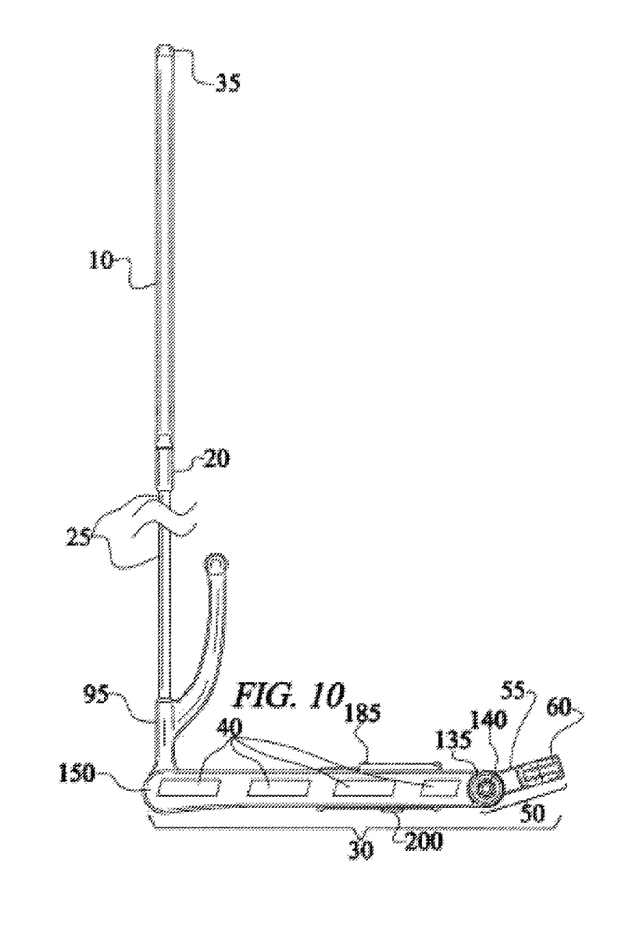
FIG. 10 is a right side view of said embodiment of the invention.
Figure 11:
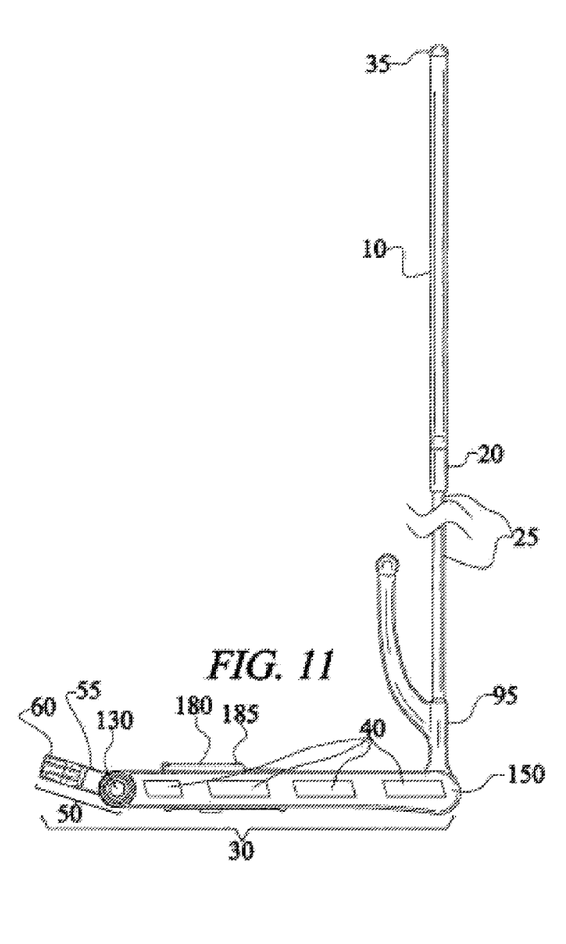
FIG. 11 is a left side view of said embodiment of the invention.

The end of the base assembly 30 into which the handle member 15 is integrated reflects the location of a detent joint 65 that enables the pivoting of the mast. At the opposite end of the base assembly 30 is located the seat clamp assembly 50. FIG. 8 and FIG. 9 present end views of this embodiment of the invention, while FIG. 10 and FIG. 11 reflect side views of said embodiment and provide further detail for the location of its various elements in relation to one another.

Figure 12:
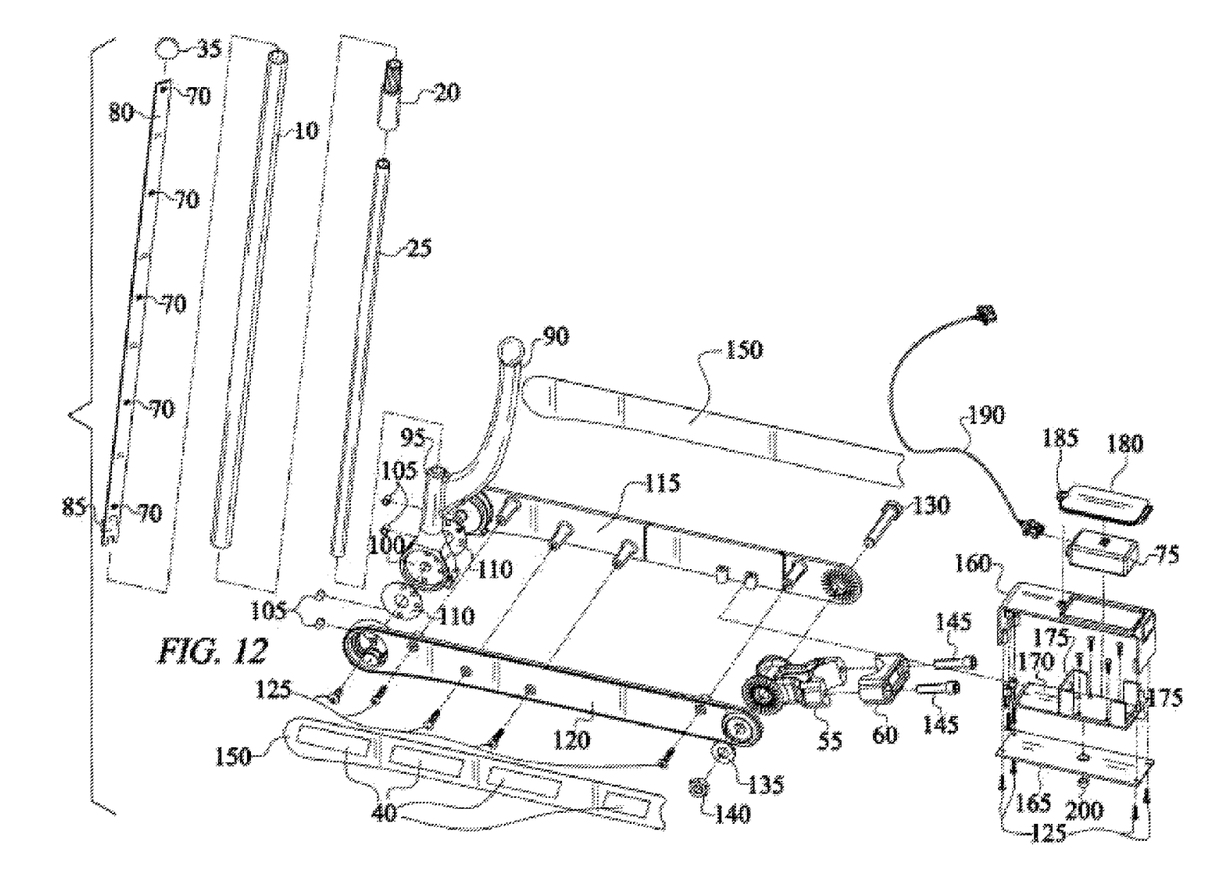
FIG. 12 is an exploded view of the base assembly and the mast in said embodiment of the invention.

FIG. 12 presents an exploded view of the illustrated embodiment of the invention. The mast 05 is comprised of a mast cap 35, tubular lens 10, mast connector 20, and mast extension tube 25. All these parts may be constructed of polycarbonate or other suitable materials. Optical clear Lexan® SLX polycarbonate, glass, or similar transparent or translucent material may be used for the tubular lens 10. A printed circuit board (PCB) 80 having five arrays of paired LEDs 70 positioned on either side of the board along its length, and a cable connector 85 attached to its lower end, is inserted into the tubular lens 10. The mast cap 35 is attached to one end of the tubular lens 10. The other end of the tubular lens 10 is attached to one end of the mast connector 20. The other end of the mast connector 20 is attached to one end of a mast extension tube 25. The other end of the mast extension tube 25 is then inserted into a mast mount 95 in the handle member 15, adjacent to a position handle 90. Epoxy or some other adhesive may be used to bond these connections securely.

The detent joint 65 located within the base assembly 30 may be a common spring-actuated lever and notched wheel design. The position handle 90 is mounted on a pivot point and in proximity to a notched wheel 100 located within the handle member 15. This allows the handle member 15 to rotate pivotally in 45-degree increments to a maximum angle of 90 degrees, as the position handle 90 is lifted or pushed out and over the top of each notch in the notched wheel 100. Spring plungers 105 are used to control incrementally the movement of the handle member 15. Wear plates 110 are positioned on either side of the notched wheel 100. The handle member 15, including its position handle 90, mast mount 95, and notched wheel 100, may be constructed of polycarbonate, metal, metal alloy, or other suitable materials.

The base assembly 30 may be formed by the mating of a main truss 115 and a secondary truss 120 about the handle member 15 at one end of the base assembly 30 and at the other end of the base assembly 30 about the seat clamp assembly 50, comprised of a seat clamp 55 and clamp cap 60. The trusses 115, 120 and the seat clamp assembly 50 may be made of polycarbonate, metal, metal alloy, or other suitable materials.

In the illustrated embodiment, hi-low thread-forming screws 125 are used to join securely the main truss 115 to the secondary truss 120, and to secure the handle member 15, but other suitable fastening means may be employed. The seat clamp 55 may be joined to the base assembly 30 by means of a hex bolt 130, flat washer 135, and jaw nut 140 or other fastening means that allow the seat clamp assembly 50 to pivot adjustably in relation to the base assembly 30. Fastening means—in the illustrated embodiment, head socket cap screws (HSCS) 145—are employed to secure the clamp cap 60 to the seat clamp 55. Reflective overlays 150 bearing reflective graphics 40 may be applied to the outside surface of each truss 115, 120 to enhance visibility of the base assembly 30 from either side of the bicycle.

As in this embodiment, a control box 155 may be located between the main truss 115 and the secondary truss 120 and between the seat clamp assembly 50 and the handle member 15 of the base assembly 30, and secured to the trusses 115, 120 via hi-low thread-forming screws 125 or other fastening means. In the illustrated embodiment, the control box 155 is formed, in part, by the joining of an upper segment 160 and lower segment 165 about a printed wiring assembly (PWA) 170 into which is integrated a microprocessor (not shown) and walls 175 for creating a battery compartment for a power source 75 as a power source for the apparatus (although other means of powering the apparatus, including other types and numbers of batteries and configurations thereof, ranging from a total of 6 to 14 volts for direct current, may be employed).

The PWA 170 may have reverse polarity protection and brown-out protection. A battery cover 180, which may be fixed to the control box 155 with one or more removable screws 185 or other removable fastening means, ensures the power source 75 remains in place and allows access to change the power source 75. A cable 190, which may be a 16 con 28AWG 7-strand or similar cable, connects the power source 75/75' or other power source and the PWA 170 within the control box 155 to the cable connector 85 on the mast PCB 80, which enables each array of paired LEDs 70 located on the PCB 80 within the tubular lens 10 to be powered and controlled. A switch 200 may be located on the bottom of the control box 155, or in any other suitable location, turns the power to the device on or off.

The subject innovation relates at least in part to an apparatus that includes LED array(s) located inside an extruded tubular lens within a mast that is mounted to a base assembly in order to increase the visibility of a vehicle. For instance, the apparatus can be mounted by a mounting member to a vehicle such as, but not limited to, a bicycle, a tricycle, a motorcycle, a moped, a motor scooter, an all terrain vehicle (ATV), a snowmobile, a tractor, a motorized or battery-powered ride-on toy, a two-wheeled motorized personal transport, among others.

As discussed above, the apparatus can include LEDs 70 that can be programmed to illuminate in pattern(s). In another example, the LEDs 70 can be programmed to illuminate any suitable letter, word, symbol, among others. For instance, the LEDs 70 can illuminate words associated with the vehicle to which the apparatus is mounted. In particular, the words can be, but are not limited to, "GO," "STOP," "LEFT," "RIGHT," "SLOW DOWN," "CAUTION," among others. Moreover, such words can be illuminated in corresponding colors (e.g., the color green for the word "GO"). In still another example, the LEDs 70 can illuminate symbols such as, but not limited to, arrows and shapes. For instance, a left arrow can be illuminated to warn of a left turn by a rider. In another example, a triangle can be illuminated to warn of surrounding people to take caution.

Moreover, the LEDs 70 can include a customization of a pattern for illumination. For instance, the LEDs 70 can be customized to allow an illumination of specific names, words, colors, etc. to advertise personal preferences of a rider. For instance, a rider may want to customize a color combination to express support for a particular sports team during a sporting event. Yet, at another time, the same rider may want to customize the LEDs 70 to illuminate a color combination to celebrate a holiday or event. Overall, the control box 155 can include any suitable module or electronics that enable customization for a user.

By way of example and not limitation, the apparatus can include a connection module (not shown) that allows connectivity to devices (e.g., computer, laptop, mobile device, smartphone, tablet, among others) in order for the LEDs 70 and associated pattern to be programmed. In one instance, the device can include a user-friendly application or program that can communicate with the control box 155 via the connection module in order to easily customize what is illuminated via the LEDs 70. For example, a user can download an application on a smartphone in order to communicate and program the apparatus and LEDs 70 for customized illumination patterns, words, symbols, colors, and the like.

As discussed above, the control box 155 can house any suitable electronics to control the LEDs 70. The control box 155 can be located in any suitable location on the apparatus or on a vehicle. For instance, the control box 155 can be integrated into at least one of the base assembly 30, the mast 05, the handle member 15, and/or any combination thereof. In another example, the control box 155 can be integrated into or onto the vehicle to which the apparatus is mounted. Moreover, the control box 155 can include wired or wireless connections in order to control the LEDs 70. For instance, the control box 155 can be wired to the LEDs 70 and wireless box 156 can transmit wireless signals to control what is illuminated with the LEDs 70. In a particular example, wireless box 156 can be located on a steering mechanism on a vehicle for access to the user to facilitate controlling the illumination of the LEDs 70 and/or the pattern therewith.

By way of example and not limitation, the apparatus can be mounted to a bicycle. A control box can be situated on any portion of the apparatus such as, but not limited to, the mast, the base assembly, the bicycle, and/or any combination thereof. The apparatus can include wireless box 156 that includes controls for the user to select what to illuminate via the LEDs 70. In another example, wireless box 156 can be also be wired to the apparatus in order to allow control of what (e.g., symbols, letters, shapes, etc.) is illuminated via the LEDs 70. While wireless box 156 is shown, for example, in a particular location in FIG. 1, other possible configurations will be appreciated upon stud of the disclosures herein.

As discussed above, the control box 155 can be powered by a power source. For instance, the power source can be a battery, a solar panel, a kinetic powered-based source, and/or any suitable combination thereof. For example, a solar panel can be utilized collect solar energy and store in a battery for use during low-light or no-light times of day. In another example, a kinetic powered-based source can harness energy from the vehicle or user. In such example, the spinning of a wheel can generate electricity so as to enable the apparatus to be powered for illumination of the LEDs 70. Furthermore, any combination of the power sources can be employed in order to allow the illumination of the LEDs 70. For instance, a solar power source and a first battery can enable solar energy to be stored, whereas an additional battery can be utilized for back-up if the first battery (e.g., powered by the solar panel) is consumed.

Figure 13:
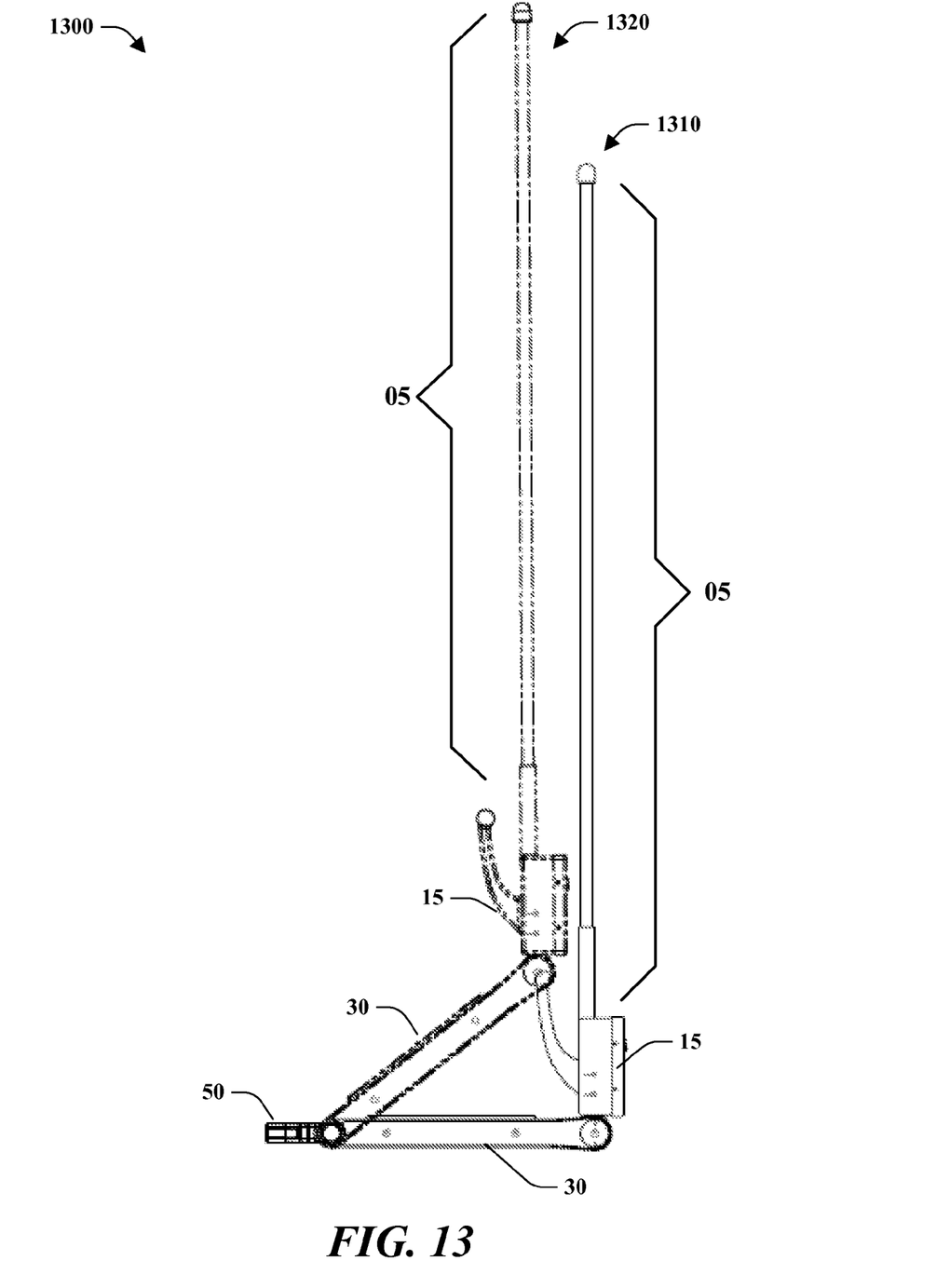
FIG. 13 is a left side view of an embodiment of the subject innovation.

Turning to FIG. 13, an apparatus 1300 is illustrated that includes the base assembly 30, the seat clamp assembly 50, the handle member 15, and the mast 05. The apparatus 1300 is illustrated in a first position 1310. Moreover, the apparatus 1300 can be maneuvered upward to a second position 1320. In particular, the apparatus 1300 can be adjusted upward and/or downward about a joint connecting the seat clamp assembly 50 to the base assembly 30. Based on this adjustment, the apparatus 1300 can further be adjusted upward and/or downward about a joint connecting the handle member 15 to the base assembly 30. The joint between a first end of the base assembly 30 and the seat clamp assembly 50 enables a raising or lowering of the handle member 15 and the connected mast 05. This joint can enable an upward or downward adjustment of approximately (60) degrees. It is to be appreciated that this joint between the base assembly 30 and the seat clamp assembly can be a detent joint, among others, and such detent joint can be of a spring-actuated lever and notched wheel design.

Furthermore, the joint between a second end of the base assembly 30 and the handle member 15 can allow another adjustment of the mast 05. This adjustment can allow further angles to be achieved based on how perpendicular the mast 05 is desired. It is to be appreciated that such adjustment enables the apparatus 1300 to be raised to a greater height in order to increase visibility of the apparatus 1300. Moreover, the handle member 15 can be utilized to adjust the mast 05 from any position from a horizontal location to a vertical position but also to increase the height of the mast 05 by raising the base assembly 30.

It is to be appreciated that the mast 05 can include a portion thereof that is telescoping. In particular, any portion of the mast 05 excluding the tubular lens that houses the LEDs can include a telescoping functionality that enables a retraction or extraction of the mast 05. In particular, referring to FIG. 1, the telescoping mechanism can be any portion between the mast connector 20 and the handle member 15. In other words, the mast extension tube 25 of the mast 05 can include telescoping components that enable the mast to extend or retract.

Figure 14:
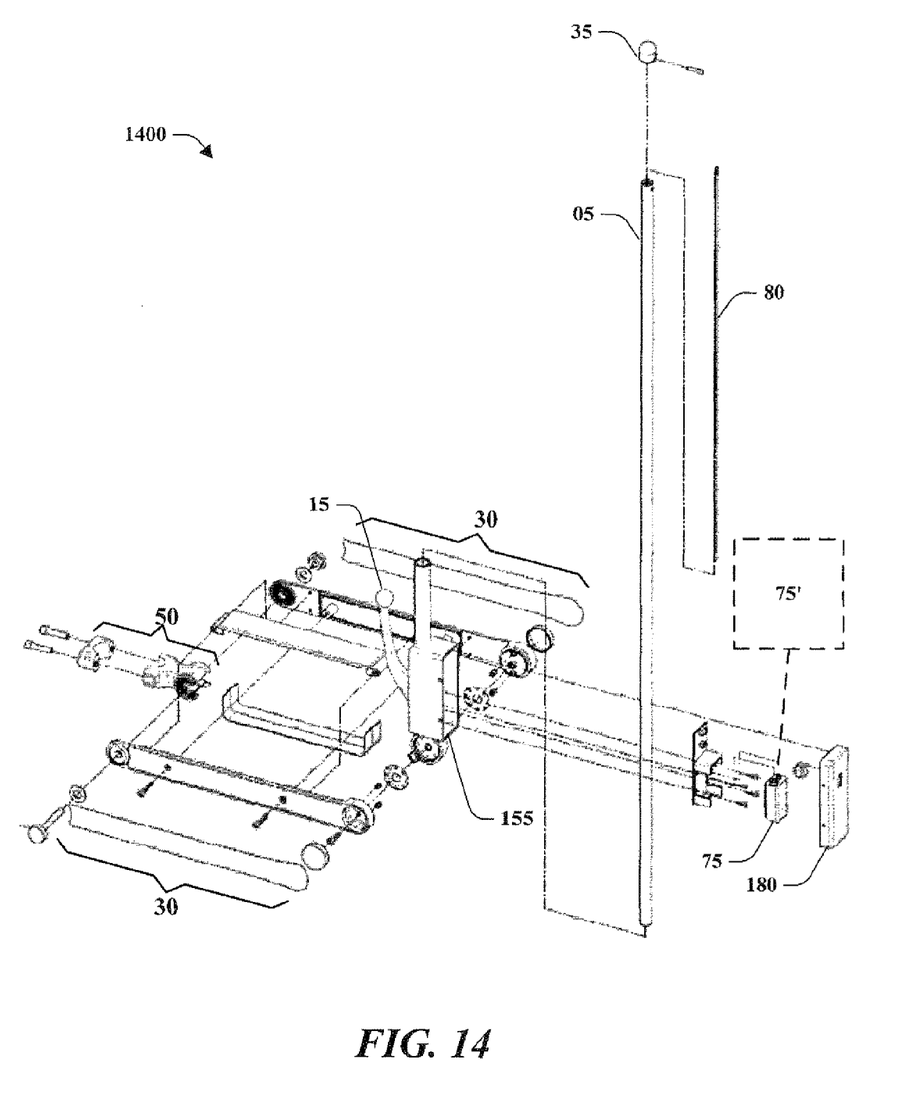
FIG. 14 is an exploded view of the base assembly and the mast in an embodiment of the subject innovation.

FIG. 14 is an exploded view of an embodiment of an apparatus 1400 that increases visibility of a rider on a vehicle. The apparatus 1400 can be attached or mounted to any suitable vehicle such as, but not limited to, a bicycle, a tricycle, a motorcycle, a moped, a motor scooter, an all terrain vehicle (ATV), a snowmobile, a tractor, a motorized or battery-powered ride-on toy, a two-wheeled motorized personal transport, a stroller, among others. For the sake of brevity, the major components of the apparatus 1400 are discussed below since the apparatus 1400 is includes components and aspects similar to those included in FIG. 12.

The apparatus 1400 includes a seat clamp assembly 50, a base assembly 30, a handle member 15, a control box 155, and a mast 05. The seat clamp assembly 50 is connected to a first end of the base assembly 30 to create a joint that allows upward and downward movement (discussed in FIG. 13). The seat clamp 50 allows mounting to any suitable vehicle and in particular, a seat post. A second end of the base assembly 30 is connected to the handle member 15. In this particular embodiment, the handle member 15 can include a location for the control box 155. The control box 155, as discussed, can include a compartment and electronics for power source 75. In embodiments, power source 75 can include multiple components, such that power source 75/75' act collectively as a single sub-aspect to provide power. Power source 75' can include, for example, a solar panel or kinetic powered-based source that acts at a distance from other components of power source 75. Moreover, the control box 155 can include a suitable batter cover or cover for the control box 180. The detent joint 65 (not shown) can enable the handle member 15 and connecting mast 05 to adjust or move from a horizontal position to a vertical position (e.g., shown in the vertical position). The mast 05 can include the PCB 80 that includes at least one LED (not shown) and/or at least one array of LEDs (not shown). The mast 05 can further include the mast cap 35.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

Specific embodiments of an innovation are disclosed herein. One of ordinary skill in the art will readily recognize that the innovation may have other applications in other environments. In fact, many embodiments and implementations are possible. The following claims are in no way intended to limit the scope of the subject innovation to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

Although the subject innovation has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (e.g., components, assemblies, devices, compositions, garments, materials, etc.), the terms (including a reference to a "means") used to describe such elements are intended to correspond, unless otherwise indicated, to any element which performs the specified function of the described element (e.g., that is functionally equivalent), even though not structurally equivalent to the disclosed structure which performs the function in the herein illustrated exemplary embodiment or embodiments of the innovation. In addition, while a particular feature of the innovation may have been described above with respect to only one or more of several illustrated embodiments, such feature may be combined with one or more other features of the other embodiments, as may be desired and advantageous for any given or particular application. Although certain embodiments have been shown and described, it is understood that equivalents and modifications falling within the scope of the appended claims will occur to others who are skilled in the art upon the reading and understanding of this specification.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. An apparatus, comprising:
an illuminable extruded tubular lens within a mast;
at least one light emitting diode (LED) within said illuminable extruded tubular lens;
a base assembly to which said mast is connected;
mounting means incorporated into said base assembly for attaching said base assembly to a mounting point on a vehicle;
a control box with a printed wiring assembly into which is integrated a programmable microprocessor; and
a handle member incorporated into said base assembly that, by means of a detent joint formed within the base assembly, allows said mast to be raised and lowered pivotally between a vertical operating position and a horizontal position parallel to the longitudinal frame of a vehicle on which the apparatus has been mounted.

2. The apparatus of claim 1, the control box is incorporated into the base assembly.

3. The apparatus of claim 1, the control box is incorporated into the handle member.

4. The apparatus of claim 1, the control box is incorporated into the mast.

5. The apparatus of claim 1 further comprises a power source for said LED and the programmable microprocessor.

6. The apparatus of claim 5, the power source is at least one of a battery, a solar panel, or a kinetic-based power source.

7. The apparatus of claim 5, the power source is incorporated into the base assembly.

8. The apparatus of claim 5, the power source is incorporated into at least one of the handle member or the mast.

9. The apparatus of claim 1 further comprises an array of LEDs that illuminate a plurality of light patterns that are alternated automatically by said programmable microprocessor.

10. The apparatus of claim 9, the light patterns include at least one of a letter, a word, a shape, or a symbol.

11. The apparatus of claim 1, the mounting point is a bicycle seat post, and the mounting means is a seat clamp assembly comprised of a seat clamp and a clamp cap.

12. The apparatus of claim 11 further comprises a second detent joint on the base assembly connecting the base assembly to the seat clamp assembly, the second detent joint allows adjustment of a height associated with the base assembly and the mast.

13. The apparatus of claim 12, the detent joint within the base assembly is of a spring-actuated lever and notched wheel design and the second detent joint on the base assembly connecting the base assembly to the seat clamp assembly is of a spring-actuated lever and notched wheel design.

14. The apparatus of claim 1 further comprises a portion of the mast that telescopes to at least one of increase or decrease a length associated with the mast.

15. An apparatus, comprising:
 an illuminable extruded tubular lens within a mast;
 at least one light emitting diode (LED) within said illuminable extruded tubular lens;
 a control box with a printed wiring assembly into which is integrated a programmable microprocessor to control the at least one LED;
 an array of LEDs that illuminate a plurality of light patterns that are customized by a user;
 a base assembly to which said mast is connected;
 mounting means incorporated into said base assembly for attaching said base assembly to a mounting point on a vehicle; and
 a handle member incorporated into said base assembly that, by means of a detent joint formed within the base assembly, allows said mast to be raised and lowered pivotally between a vertical operating position and a horizontal position parallel to the longitudinal frame of a vehicle on which the apparatus has been mounted.

16. The apparatus of claim 15, the vehicle is at least one of a bicycle, a tricycle, a motorcycle, a moped, a motor scooter, an all terrain vehicle (ATV), a snowmobile, a tractor, a motorized or battery-powered ride-on toy, a two-wheeled motorized personal transport, or a stroller.

17. The apparatus of claim 15 further comprises a wireless box that transmits a signal to the control box, the light pattern is illuminated based upon the signal.

18. An apparatus, comprising:
 an illuminable extruded tubular lens within a mast;
 at least one light emitting diode (LED) within said illuminable extruded tubular lens;
 a base assembly to which said mast is connected;
 a control box with a printed wiring assembly into which is integrated a programmable microprocessor, a power source for said LED and the programmable microprocessor, and a switch for turning on and off said LED;
 mounting means incorporated into said base assembly for attaching said base assembly to a mounting point on a vehicle;
 a handle member incorporated into said base assembly that, by means of a detent joint formed within the base assembly, allows said mast to be raised and lowered pivotally between a vertical operating position and a horizontal position parallel to the longitudinal frame of a vehicle on which the apparatus has been mounted; and
 a portion of the mast that telescopes to at least one of increase or decrease a length associated with the mast.

* * * * *